United States Patent [19]

Bouchard et al.

[11] Patent Number: 5,845,013

[45] Date of Patent: Dec. 1, 1998

[54] REGION-BASED TEXTURE CODING METHOD AND DECODING METHOD, AND CORRESPONDING SYSTEMS

[75] Inventors: Lionel Bouchard, Paris; Régine Askenatzis, Marseille, both of France

[73] Assignee: U.S. Philips Corporation, New York, N.Y.

[21] Appl. No.: 734,005

[22] Filed: Oct. 18, 1996

[30] Foreign Application Priority Data

Oct. 18, 1995 [EP] European Pat. Off. .............. 95402324

[51] Int. Cl.⁶ ...................................... G06K 9/48
[52] U.S. Cl. ........................ 382/242; 382/232; 382/166; 348/398
[58] Field of Search .................................. 382/242, 232, 382/166, 228; 348/416, 398, 397

[56] References Cited

U.S. PATENT DOCUMENTS 5,204,920  4/1993  Moran et al. ............................ 382/166
5,612,744  3/1997  Lee et al. ................................. 348/416
5,671,294  9/1997  Rogers et al. ........................... 382/228

OTHER PUBLICATIONS

"A Lattice Vector Quantization Using a Geometric Decomposition", Ting–Chung Chen, IEEE Transcations on Communications, vol. 38, No. 5, May 1990.

"An Algorithm For Vector Quantier Design", Y. Linde and Al, IEEE–Transactions on Communications, vol. 28, No. 1, Jan. 1980, pp. 84–95.

Primary Examiner—Jose L. Couso
Assistant Examiner—Anh Hong Do
Attorney, Agent, or Firm—Laurie E. Gathman

[57] ABSTRACT

The invention relates to an image sequence coding method in which images are segmented and coded with respect to their contours and textures. The texture coding step is carried out by means of a lattice vector quantization method adapted to region-based coding schemes where regions have arbitrary shapes, for applications allowing to reach very low bit rates while keeping a good image quality.

8 Claims, 3 Drawing Sheets

REGION-BASED TEXTURE CODING METHOD AND DECODING METHOD, AND CORRESPONDING SYSTEMS

BACKGROUND OF THE INVENTION

The present invention relates to a method of coding images of an image sequence comprising the following steps:

(A) segmentation of each current image into homogeneous regions;

(B) coding of the contours of said regions;

(C) coding of the textures of said regions. It also relates to a corresponding decoding method, and to systems for implementing said coding and decoding methods.

This invention finds applications in the field of very low bitrate video coding and is particularly attractive in relation to the emerging coding standard MPEG4 supporting new ways for communication, access and manipulation of digital audio-visual data.

Among the recent image coding techniques, those which are region-based seem to be very promising. Basically, they rely on three steps. First, the images are splitted into homogeneous regions (in terms of colour and/or motion), in order to get a partition of adjacent regions. Then, the contours of the regions are transmitted. In the last step, called texture coding, the colour information is transmitted.

The goal of a region-based texture coding procedure is to encode the grey-level or colour information inside each region of an image partition. As schematically shown in FIG. 1, generally a transform (TR, in FIG. 1) is first performed on the pixels of the regions of the original image (ORIM) in order to get coefficients which are more suited for quantization and encoding (for instance, a discrete cosine transform, which allows the texture information to be represented in the frequency space, or a shape-adaptive wavelet transform, which allows to get coefficients in the space/frequency plane). Then these coefficients are quantized (Q) and finally a bitstream is generated by an entropy coder (COD) and sent to the transmission channel (TRCH). At the decoder side, the inverse operations (entropy decoding DEC, inverse quantization $Q^{-1}$, inverse transform $TR^{-1}$) are performed to yield a reconstructed image (RECIM), as also illustrated in FIG. 1.

Among all the techniques described for the quantization of the transformed coefficients, the lattice vector quantization (LVQ) has proved to be a good compromise between coding cost and computation time. This technique, described for example in "A Lattice Vector Quantization Using a Geometric Decomposition", T. C. Chen, IEEE-Transactions on Communications, vol.38, n°5, May 1990, pp.704–714, is often used to quantize wavelet coefficients and has been built in the framework of block-based structures. Vector quantization relies on the approximation of blocks of pixels (referred to as "the vectors" below) by representants belonging to a catalogue constituting a set of reproduction vectors and also called the codebook: for the purposes of transmission and/or storage, a binary codeword called the index is associated to each considered data vector. At the receiving and decoding side, a vector quantizer then associates a reproduction vector of the codebook to the index that has been transmitted and/or stored. The well known LBG algorithm, often used to design a vector quantization codebook and described for instance in "An Algorithm for Vector Quantizer Design", Y. Linde and al, IEEE-Transactions on Communications, vol.28, n°1, January 80, pp.84–95, has two drawbacks : the creation of a codebook for high bit rates is complex and the approximation of a vector by an element in a large codebook requires a significant processing time, since for each vector, the entire dictionary must be browsed to find the best match in terms of distance.

To mitigate these drawbacks, a sub-optimal vector quantization having however a good efficiency can be used where the catalogue is a lattice (this quantization is referred to as the lattice vector quantization, or LVQ). A lattice is an array of points located at even distances in a n-dimensional space, i.e. a lattice is composed of all integral combinations of a set of linearly independent vectors. For instance, a lattice D(n) is defined as:

$$D(n) = \left\{ \text{for } Y \in R^m / Y = \sum_{i=1}^{i=n} x_n a_n \right\} \quad (1)$$

where $a_1, a_2, \ldots, a_n$ are said vectors in the m-dimensional real Euclidean space and $x_1, x_2, \ldots, x_n$ are in Z.

Some authors have proposed a fast quantization algorithm for the LVQ based upon the lattice D(n): a vector with real coordinates is approximated by the two closest integer vectors, and the representant in the codebook is the one with an even sum. The search of the representant in the codebook is thus very simple even for large codebooks. In order to handle a codebook of finite size, the lattice may be truncated (in practice, only the vectors of energy smaller than a given energy, referred to as Truncated Energy below and in FIG. 2, are kept). Moreover, to optimize the trade off between minimum distortion and bit rate, the lattice is scaled. To encode the vectors, they are projected on or within surfaces of constant energy using a scaling factory. A surface called pyramid for the laplacian distribution is defined by $$\text{Surface(energy)} = \left\{ (x \in R^n) / \left( \sum_{i=1}^{n} |x_i| = \text{energy} \right) \right\} \quad (2)$$

The main following steps are then performed at the encoding side:

truncate the lattice in order to define the dictionary size;

select a maximal energy for the source to be encoded;

project the source vectors of energy lower than or equal to the maximal energy in the truncated lattice by dividing by γ=Maximal Energy/Truncated Energy;

project the source vectors of energy higher than the maximal energy on the surface of the truncated lattice by scaling them by an appropriate normalization parameter α and send it to the decoder;

send to the decoder the index of the nearest lattice vector which has been determined by applying the fast quantization algorithm.

FIG. 2, which schematizes an LVQ encoding phases for a D(2) lattice, shows three input vectors x1, x2, x3 (indicated by small circles) and the quantization of these input vectors (the quantized vectors Λx are indicated by small squares): x1 has an energy greater than the maximal energy ME (indicated by the dotted line while the truncated one is indicated by the reference TE), x2 has an energy equal to the maximal energy, and x3 has an energy lower than the maximal energy.

The dequantization is the inverse process of the quantization. It relies on two steps: (a) find the lattice vector associated to the index, and (b) rescale the lattice vector by the inverse scaling factor $1/_\gamma$.

When dealing with block-based schemes, the transformed coefficients are grouped in blocks, and each block forms a vector that will be quantized according to the process described above. For instance, in the case of the lattice D4, which is often used in the experiments, the input vectors to be quantized by LVQ are split into blocks of size 2×2. This allows to benefit from the vertical and horizontal correlations of the transformed coefficients. However, in the case of region-based schemes, this splitting cannot be performed since the regions have arbitrary shapes.

SUMMARY OF THE INVENTION

It is a first object of the invention to propose a new region-based texture coding method, based on an adaptation of the lattice vector quantization (LVQ) to region-based schemes dealing with arbitrary shapes.

At this end the invention relates to a coding method as described in the preamble' of the description and wherein said texture coding step comprises the following five operations, performed for each region (a) building of the smallest rectangle surrounding the considered region;

(b) splitting of the rectangle in blocks of size 2×2;

(c) storage of transformed coefficients in vectors of size 1, 2, 3 or 4

(d) selection of the codebook corresponding to the vector size;

(e) lattice vector quantization of the current vector; the operations (c) to (e) being carried out for each block previously transformed in order to get said coefficients.

Such a method presents an efficient splitting of the regions, which allows to adapt to arbitrary shapes while handling correlated transformed coefficients blocks.

It is another object of the invention to propose a coding system for implementing this method.

At this end the invention relates to a system for coding images of an image sequence, comprising:

segmentation means for defining in each successive current image homogeneous regions;

contour and texture coding means for respectively coding the contours and the textures of the regions of said image;

wherein said texture coding means comprise a processor carrying out in an iterative manner for each region the following operations:

(a) building of the smallest rectangle surrounding the considered region and splitting said rectangle into blocks of size 2×2;

(b) for each block, storage of transformed coefficients in vectors of size 1, 2, 3 or 4, selection of a codebook corresponding to said vector size, and lattice vector quantization of each vector.

It is another object of the invention to propose a method appropriate for decoding signals coded according to said coding method, and a corresponding decoding system.

At this end the invention relates to both a method of decoding coded signals corresponding to images of a sequence that have been coded by way of a method as described above, wherein said decoding method comprises the following five steps, performed for each region:

(a) building of the smallest rectangle surrounding the concerned region;

(b) splitting of the rectangle in blocks of size 2×2;

(c) determination of the vector size;

(d) selection of the codebook corresponding to the vector size;

(e) lattice vector dequantization; the operations (c) to (e) being carried out for each block, and to a corresponding system comprising:

decoding means for decoding the coded signals corresponding to the contours of the regions;

decoding means for decoding the coded signals corresponding to the textures of the regions;

reconstruction means for the restitution of images corresponding to the original ones;

wherein said reconstruction means comprise, for said restitution, a processor carrying out in an iterative manner for each region the following operations:

(a) building of the smallest rectangle surrounding the concerned region and splitting said rectangle into blocks of size 2×2;

(b) for each block, determination of the vector size, selection of a codebook corresponding to said vector size, and lattice vector dequantization of each vector.

BRIEF DESCRIPTION OF THE DRAWING

These and other aspects of the invention will be apparent from and elucidated with reference to the embodiments described hereinafter.

In the drawings.

DETAILED DESCRIPTION OF THE PREFERRED EMBODIMENTS

Figure 1:
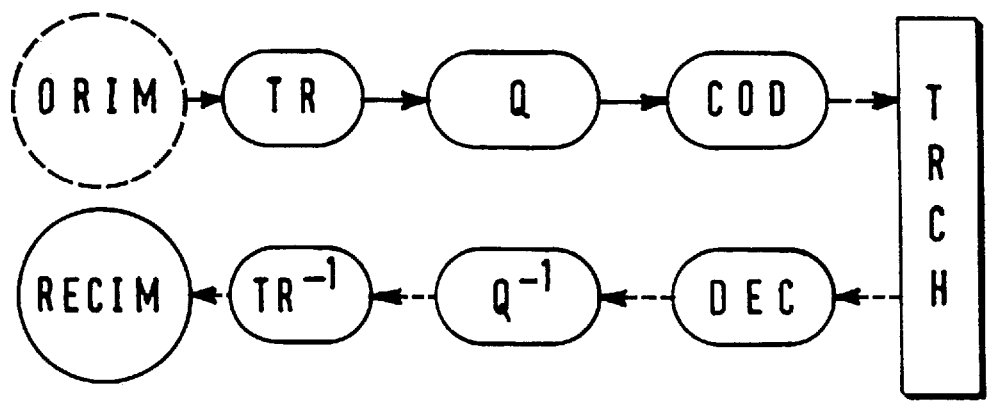
FIG. 1 shows schematically a texture encoding and decoding structure.
Figure 2:
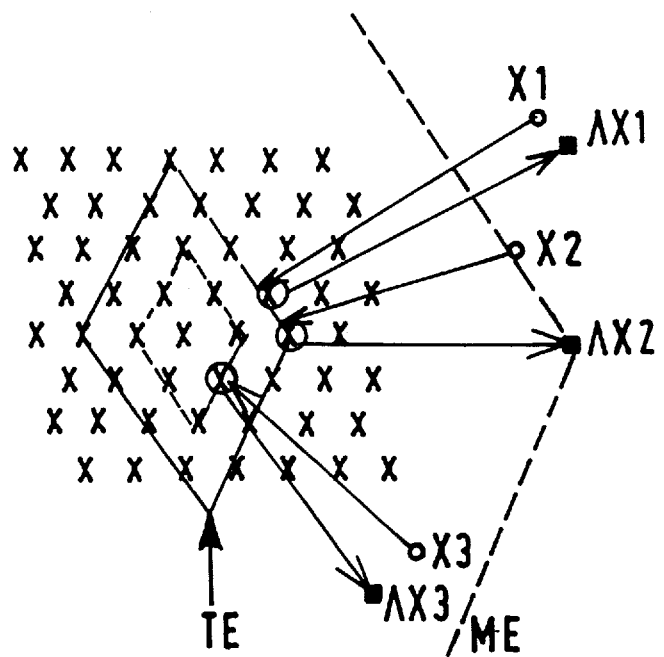
FIG. 2 illustrates the LVQ encoding procedure for a D(2) lattice.
Figure 3:
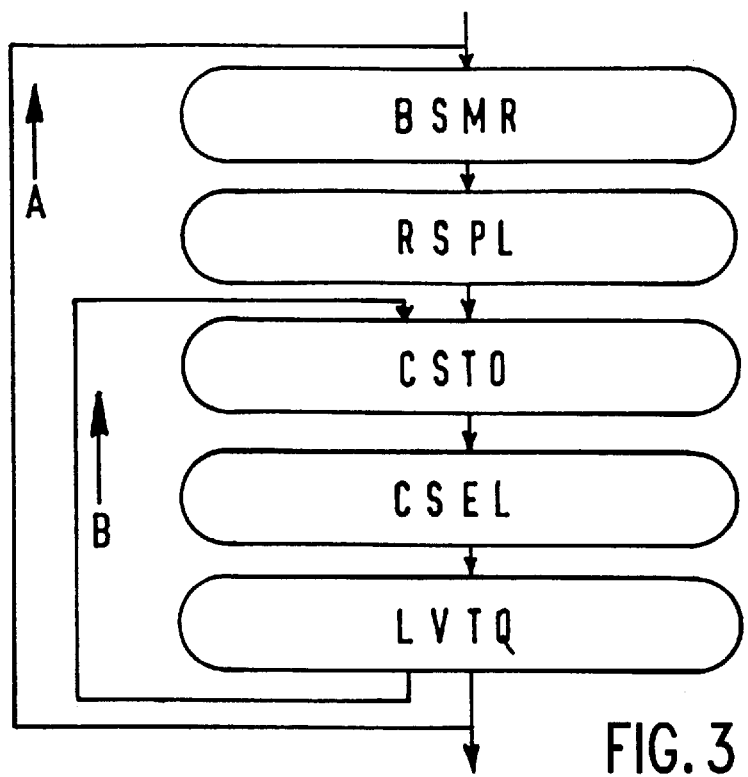
FIGS. 3 and 4 illustrate schematically a shape-adaptive lattice vector quantization at the coding side and at the decoding side respectively.
Figure 4:
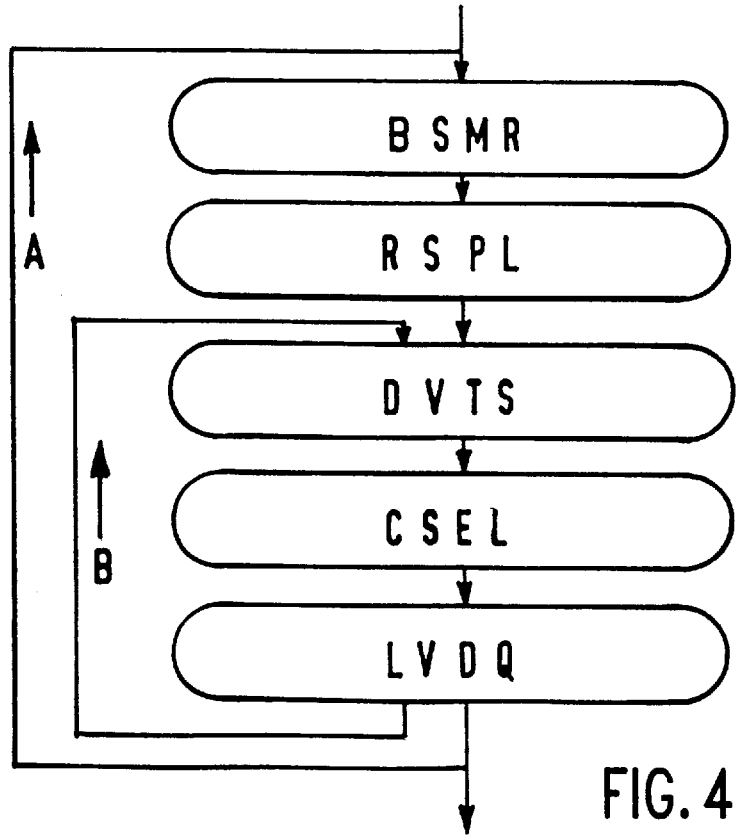

Basically, the proposed implementation relies on the use of the D(4) lattice, which will be described in details, but it can be extended easily to the general case of D(n) lattices. The same process is performed for each region (arrow A) of the image partition and is depicted in FIGS. 3 and 4 corresponding respectively to the encoding and decoding sides.

Figure 5:
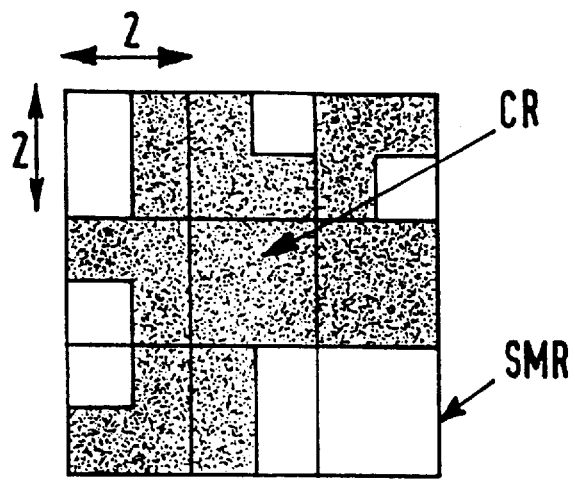
FIG. 5 illustrates a region splitting in blocks of size 2×2.
Figure 6:
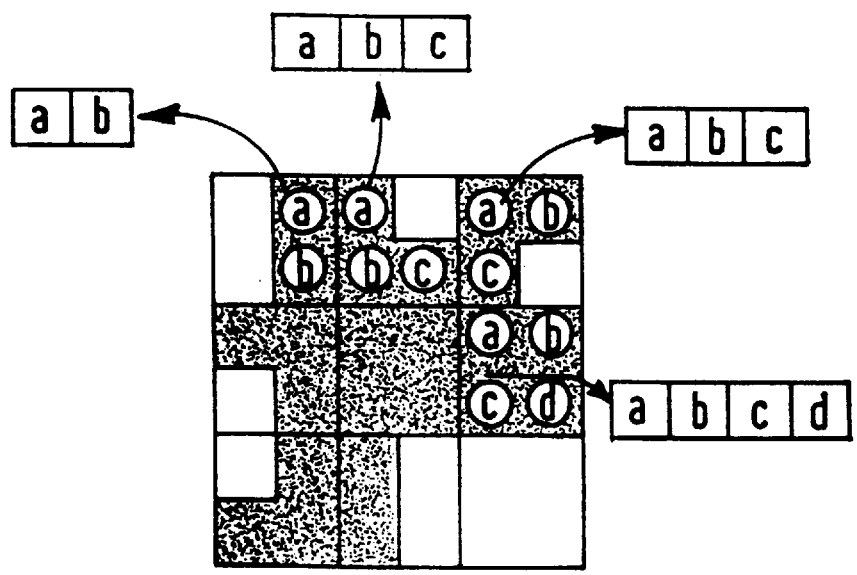
FIG. 6 illustrates the storage of the vectors to be quantized.

First, the smallest rectangle of even horizontal and vertical length surrounding the current region is determined (BSMR, for building of the smallest rectangle). Then, this rectangle is splitted (rectangle splitting RSPL) into blocks of size 2×2, as shown in FIG. 5 showing a current region CR and said smallest rectangle SMR. For each block, the transformed coefficients belonging to the current region are stored (coefficient storage CSTO) in a vector to be quantized, the size of which depends on the number of coefficients (the same scanning is used at the coding and decoding sides: from the left to the right and from the top to the bottom, and FIG. 6 illustrates this step). Thus, vectors to be quantized (ab, abc, abcd, . . . ) of size 1, 2, 3 or 4 are built. Regarding the lattice vector quantization, it means that an appropriate codebook corresponding to the vector size has then to be chosen for the quantization (codebook selection): D(1), D(2), D(3) or D(4), according to the current vector size. Finally a lattice vector quantization LVTQ of the current vector is carried out. The three last operations are performed for each block (arrow B).

The decoding process is very similar to the coding one. The regions are splitted (RSPL) into blocks of size 2×2 contained in the smallest rectangles surrounding them (BSMR). Then, after a determination of the vector size (DVTS), the number of pixels belonging to the region in each block indicates (see FIG. 6) which codebook has to be selected (CSEL) for the final lattice vector dequantization (LVDQ).

The present invention is not limited to these coding and decoding methods from which modifications or improvements can be deduced without departing from the scope of the invention.

The same scheme can be for instance slightly modified to be used with any lattices D(n), with n >1. In the general case, a splitting of the smallest rectangle surrounding the current region in blocks of n pixels can be considered. This involves the use of n codebooks in the lattice vector quantization: D(1), D(2), . . . D(n).

Moreover, the invention also relates to corresponding coding and decoding systems. It is clear that the proposed coding method can be implemented in several manners, such as with the aid of wired electronic modules or, preferably, in the form of a coding system including a processor or a microprocessor that ensures the performance of series of instructions corresponding to the operations previously described in relation with the coding method and carried out within such electronic modules. Similarly the corresponding decoding method may be implemented in several manners and especially by way of a decoding system including processing means for performing the instructions corresponding to the above-described operations.

It must also be said that most often, lattices of the type D(n) are used for the lattice vector quantization. Nevertheless, the proposed methods do not depend on this type of lattice. The process presented above remains available whatever the lattice to be used.

We claim:

1. A method of coding images of an image sequence, the method comprising the following steps:

(A) segmenting each image in the image sequence into homogeneous regions comprised of textures and contours;

(B) coding the contours of said regions; and (C) coding the textures of said regions;

wherein, for each region, said texture coding step comprises:

(a) building a smallest rectangle surrounding the region;

(b) splitting the rectangle into 2×2 blocks;

(c) storing transformed coefficients for each of the 2×2 blocks in vectors having sizes defined as 1, 2, 3 or 4;

(d) selecting a codebook for each vector, the selecting step selecting a codebook for each vector that corresponds to a size of the vector; and (e) performing lattice vector quantization on each vector in accordance with the codebook selected in the selecting step.

2. A decoding method for decoding signals corresponding to images of an image sequence that have been coded using the method of claim 1, wherein said decoding method comprises the following steps, which are performed for each region of a coded image:

(a) building a smallest rectangle surrounding the region;

(b) splitting the rectangle into 2×2 blocks;

(c) determining sizes of vectors which store transformed coefficients for each one of the 2×2 blocks;

(d) selecting a codebook, for each vector, that corresponds to a size of the vector; and (e) performing lattice vector dequantization on each vector in accordance with the codebook selected in the selecting step.

3. A method according to claim 1, wherein the rectangle built in the building step has equal horizontal and vertical dimensions.

4. A method according to claim 1, wherein the regions have arbitrary shapes.

5. A system for coding images of an image sequence, the system comprising:

segmentation means for defining homogeneous regions in each image in the image sequence;

contour coding means for coding contours of the regions of each image; and texture coding means for coding textures of the regions of each image, said texture coding means comprising a processor which, for each region, (a) builds a smallest rectangle surrounding the region, (b) splits said rectangle into 2×2 blocks, (c) stores transformed coefficients for each of the 2×2 blocks in vectors having sizes defined as 1, 2, 3 or 4, (d) selects a codebook for each vector corresponding to a size of the vector, and (e) performs lattice vector quantization on each vector in accordance with a selected codebook.

6. A decoding system for decoding coded signals corresponding to images of an image sequence that have been coded in the coding system of claim 5, said decoding system comprising:

contour decoding means for decoding coded signals corresponding to contours of the regions;

texture decoding means for decoding coded signals corresponding to textures of the regions; and reconstruction means for reconstructing images that correspond to original images in the image sequence based on decoded signals from the contour decoding means and the texture decoding means, said reconstruction means comprising a processor which, for each region, (a) builds a smallest rectangle surrounding the region, (b) splits said rectangle into 2×2 blocks, (c) determines sizes of vectors which store transformed coefficients for each one of the 2×2 blocks, (d) selects a codebook for each vector, that corresponds to a size of the vector, and (e) performs lattice vector dequantization on each vector in accordance with a selected codebook.

7. A system according to claim 5, wherein the rectangle built by the processor has equal horizontal and vertical dimensions.

8. A system according to claim 5, wherein the regions have arbitrary shapes.

* * * * *